(12) United States Patent  
Watson et al.

(10) Patent No.: US 9,332,025 B1  
(45) Date of Patent: May 3, 2016

(54) SYSTEMS AND METHODS FOR DETECTING SUSPICIOUS FILES

(71) Applicant: Symantec Corporation, Mountain View, CA (US)

(72) Inventors: Andrew Watson, Gloucestershire (GB); Stephen White, Hampshire (GB)

(73) Assignee: Symantec Corporation, Mountain View, CA (US)

( * ) Notice: Subject to any disclaimer, the term of this patent is extended or adjusted under 35 U.S.C. 154(b) by 114 days.

(21) Appl. No.: 14/138,124

(22) Filed: Dec. 23, 2013

(51) Int. Cl.  
*H04L 29/06* (2006.01)

(52) U.S. Cl.  
CPC ........ *H04L 63/1441* (2013.01); *H04L 63/1408* (2013.01); *H04L 63/145* (2013.01)

(58) Field of Classification Search  
CPC .. H04L 63/146; H04L 63/1408; H04L 63/145  
USPC .......................................................... 726/22  
See application file for complete search history.

(56) References Cited

U.S. PATENT DOCUMENTS

| | | | | |
|---|---|---|---|---|
| 6,564,202 | B1 * | 5/2003 | Schuetze | G06F 17/3061 |
| 7,660,815 | B1 * | 2/2010 | Scofield | G06F 17/30702 |
| | | | | 707/999.102 |
| 7,774,845 | B2 * | 8/2010 | Shipman | G06F 21/564 |
| | | | | 380/2 |
| 8,621,615 | B2 * | 12/2013 | Zhao | H04L 12/2602 |
| | | | | 370/252 |
| 8,627,476 | B1 * | 1/2014 | Satish | G06F 21/51 |
| | | | | 713/187 |
| 8,689,331 | B2 * | 4/2014 | Feeney et al. | G06F 21/563 |
| | | | | 726/24 |
| 2005/0108001 | A1 * | 5/2005 | Aarskog | 704/10 |
| 2007/0298720 | A1 * | 12/2007 | Wolman | H04L 63/1408 |
| | | | | 455/66.1 |
| 2008/0077995 | A1 * | 3/2008 | Curnyn | H04L 63/1441 |
| | | | | 726/27 |
| 2009/0138972 | A1 * | 5/2009 | Scales | G06F 21/56 |
| | | | | 726/24 |
| 2010/0054278 | A1 * | 3/2010 | Stolfo et al. | 370/474 |
| 2012/0240236 | A1 * | 9/2012 | Wyatt et al. | 726/25 |
| 2013/0246335 | A1 * | 9/2013 | Ahuja | G06F 17/30713 |
| | | | | 707/600 |
| 2014/0137184 | A1 * | 5/2014 | Russello | G06F 21/60 |
| | | | | 726/1 |

FOREIGN PATENT DOCUMENTS

| | | | | |
|---|---|---|---|---|
| CN | 102523279 | A * | 6/2012 | H04L 29/08 |
| EP | 2733892 | A1 * | 5/2014 | H04L 67/06 |

OTHER PUBLICATIONS

Lemos, Robert, "Got Malware? Three Signs Revealed in DNS Traffic", http://www.darkreading.com/monitoring/got-malware-three-signs-revealed-in-dns/240154181, as accessed Nov. 14, 2013, (May 3, 2013).

(Continued)

*Primary Examiner* — Harunur Rashid  
*Assistant Examiner* — Sakinah Taylor  
(74) *Attorney, Agent, or Firm* — ALG Intellectual Property, LLC

(57) ABSTRACT

A computer-implemented method for detecting suspicious files may include (1) detecting a file within incoming file traffic directed to a file recipient, (2) identifying a type of the file within the incoming file traffic directed to the file recipient, (3) determining a frequency with which the type of the file appears within the incoming file traffic directed to the file recipient, and (4) performing a security action on the file in response to the frequency of the type of the file within the incoming file traffic falling below a predetermined threshold. Various other methods, systems, and computer-readable media are also disclosed.

20 Claims, 7 Drawing Sheets

(56) References Cited

OTHER PUBLICATIONS

Panzarino, Matthew, "Security firm: iOS Configuration Profiles could be vector for Apple's first big malware wave", http://thenextweb.com/apple/2013/03/12/security-researchers-say-ios-provisioning-profiles-could-provide-vector-for-apple-platforms-first-big-malware-wave/, as accessed Nov. 14, 2013, (Mar. 12, 2013).

Akujobi, F. et al., "Detection of slow malicious worms using multi-sensor data fusion", http://ieeexplore.ieee.org/xpls/abs_all.jsp?arnumber=5356557, as accessed Nov. 14, 2013, IEEE Symposium on Computational Intelligence for Security and Defense Applications, 2009. CISDA 2009., IEEE, Ottawa, ON, (Jul. 8-10, 2009), 1-9.

Qian, Jiang-Hai et al., "Gravity Model for Transportation Network Based on Optimal Expected Traffic", http://link.springer.com/chapter/10.1007%2F978-3-642-02466-5_49#page-1, as accessed Nov. 14, 2013, Complex Sciences, Lecture Notes of the Institute for Computer Sciences, Social Informatics and Telecommunications Engineering, vol. 4, Springer, (2009), 514-524.

"Unit 3.11 Specification, Development and Use of Models for Major Public Transport Schemes", http://www.dft.gov.uk/webtag/documents/expert/unit3.11.php, as accessed Nov. 14, 2013, Integrated Transport Economics and Appraisal, Department for Transport, London, UK, (Apr. 2009).

"Transport strategy and transport modelling with PTV Visum", http://vision-traffic.ptvgroup.com/en-uk/products/ptv-visum/, as accessed Nov. 14, 2013, PTV Group, (Oct. 29, 2013).

Polatcan, Onur et al., "E-mail Behavior Profiling based on Attachment Type and Language", http://www.albany.edu/iasymposium/proceedings/2011/6-PolatcanReview.pdf, as accessed Nov. 14, 2013, Annual Symposium on Information Assurance (ASIA), Albany, NY, (Jun. 7-8, 2011).

"SonicWALL Email Anti-Virus Subscription", https://www.sonicwall.com/app/projects/file_downloader/document_lib.php?t=DS&id=227, as accessed Nov. 14, 2013, SonicWALL L.L.C., (Oct. 8, 2012).

* cited by examiner

SYSTEMS AND METHODS FOR DETECTING SUSPICIOUS FILES

BACKGROUND

The average Internet user encounters hundreds if not thousands of files on a daily basis. These can range from Hypertext Markup Language files that display web pages, embedded audio and visual files that play music and movies, image files, and document files, to email attachments containing files of all those types and more. The vast majority of files encountered in web traffic are benign. However, it may take as little as a single malicious file to cause serious damage to a computing system. Malicious files may delete crucial documents, rewrite operating system settings, send spam from a user's account, expose confidential data, or take other malicious actions.

Traditional systems for detecting suspicious, potentially malicious files often rely on heuristics that analyze the file for markers of malicious potential. However, some file types, including executable files, are very difficult to analyze in this fashion because many actions, such as sending or deleting files, are benign in some contexts but malicious in others. Traditional systems may either flag these files as suspicious, generating a large number of false positives, or ignore the files, potentially allowing a malicious file to reach a user. Neither of these consequences is ideal from the user's perspective. Accordingly, the instant disclosure identifies and addresses a need for additional and improved systems and methods for detecting suspicious files.

SUMMARY

As will be described in greater detail below, the instant disclosure generally relates to systems and methods for detecting suspicious files by determining the relative frequencies of various file types within incoming file traffic for a file recipient and taking security actions on files of types less commonly received by the file recipient. As detailed below, less common file types may be more likely to be malicious, as they may be less likely to be a file the file recipient is intending to download.

In one example, a computer-implemented method for detecting suspicious files may include (1) detecting a file within incoming file traffic directed to a file recipient, (2) identifying a type of the file within the incoming file traffic directed to the file recipient, (3) determining a frequency with which the type of the file appears within the incoming file traffic directed to the file recipient, and (4) performing a security action on the file in response to the frequency of the type of the file within the incoming file traffic falling below a predetermined threshold.

The security action may take a variety of forms. In one embodiment, the security action may include blocking a download of the file and/or warning a user about the file. Additionally or alternatively, the security action may include calculating a security risk score for the file and/or performing a security check on the file.

In some examples, the computer-implemented method may further include determining the predetermined threshold by (1) tracking a number of files of each type in a plurality of file types within the incoming traffic directed to the file recipient, (2) calculating a relative frequency for each type of file in the plurality of types of files within the incoming traffic, and (3) setting the predetermined threshold based on the relative frequency of the plurality of types of files.

The incoming file traffic may be of a variety of types of traffic, including hypertext transfer protocol traffic, file transfer protocol (FTP) traffic, and/or email traffic. In addition, the file recipient may include a user account and/or a group of user accounts.

In some examples, the computer-implemented method may further include (1) detecting a file of the type within additional incoming traffic directed to an additional file recipient, (2) determining an additional frequency with which the type of the additional file appears within the additional incoming traffic directed to the additional file recipient, and (3) allowing a download of the file by the additional file recipient based on the additional frequency of the type of the additional file falling above the predetermined threshold.

In one example, the file may be an executable file. For example, the computing-implemented method may include (1) detecting a file within incoming file traffic by detecting an executable file, (2) identifying a type of the file by identifying that the type of the file includes an executable file type, (3) determining a frequency with which the type of the file appears by determining the frequency with which the executable file type appears, and (4) performing a security action on the file by performing a security action based at least in part on determining that the file may include the executable file.

In one embodiment, a system for implementing the above-described method may include (1) a detection module, stored in memory, that detects a file within incoming file traffic directed to a file recipient, (2) an identification module, stored in memory, that identifies a type of the file within the incoming file traffic directed to the file recipient, (3) a determination module, stored in memory, that determines a frequency with which the type of the file appears within the incoming file traffic directed to the file recipient, (4) a security module, stored in memory, that performs a security action on the file in response to the frequency of the type of the file within the incoming file traffic falling below a predetermined threshold, and (5) at least one processor that executes the detection module, the identification module, the determination module, and the security module.

In some examples, the above-described method may be encoded as computer-readable instructions on a computer-readable medium. For example, a computer-readable medium may include one or more computer-executable instructions that, when executed by at least one processor of a computing device, may cause the computing device to (1) detect a file within incoming file traffic directed to a file recipient, (2) identify a type of the file within the incoming file traffic directed to the file recipient, (3) determine a frequency with which the type of the file appears within the incoming file traffic directed to the file recipient, and (4) perform a security action on the file in response to the frequency of the type of the file within the incoming file traffic falling below a predetermined threshold.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
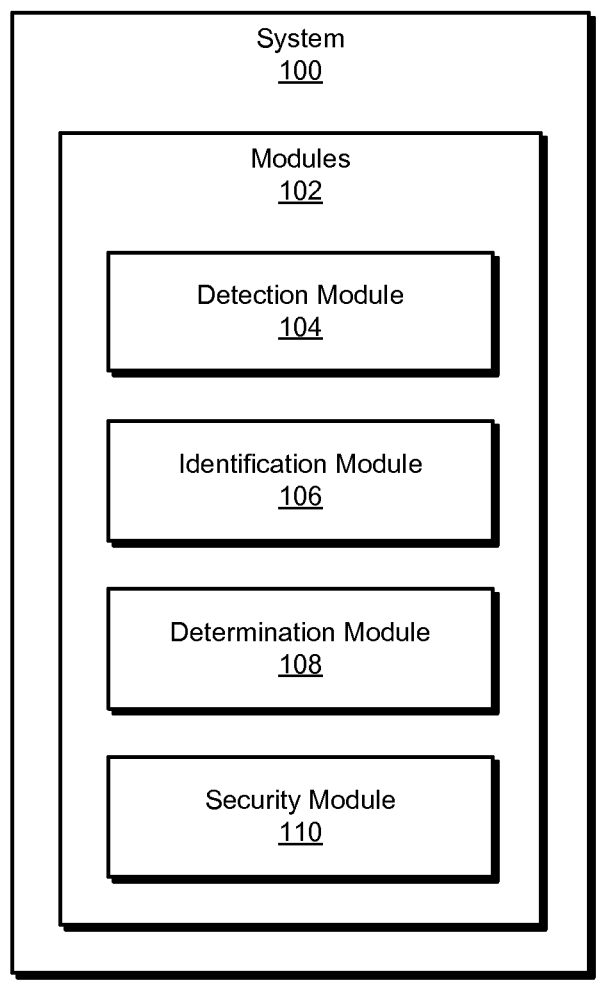
FIG. 1 is a block diagram of an exemplary system for detecting suspicious files.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting suspicious files. As will be explained in greater detail below, by detecting suspicious files based on file type frequencies, the systems described herein may detect potentially malicious files that other security systems may miss. The systems described herein may also prevent users from becoming frustrated when the user expectation that files of uncommon file types will be flagged by security systems is not met.

The following will provide, with reference to FIGS. 1, 2, 4, and 5, detailed descriptions of exemplary systems for detecting suspicious files. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for detecting suspicious files. As illustrated in this figure, exemplary system 100 may include one or more modules 102 for performing one or more tasks. For example, and as will be explained in greater detail below, exemplary system 100 may include a detection module 104 that may detect a file within incoming file traffic directed to a file recipient. Exemplary system 100 may additionally include an identification module 106 that may identify a type of the file within the incoming file traffic directed to the file recipient. Exemplary system 100 may also include a determination module 108 that may determine a frequency with which the type of the file appears within the incoming file traffic directed to the file recipient.

Exemplary system 100 may additionally include a security module 110 that may perform a security action on the file in response to the frequency of the type of the file within the incoming file traffic falling below a predetermined threshold. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Figure 2:
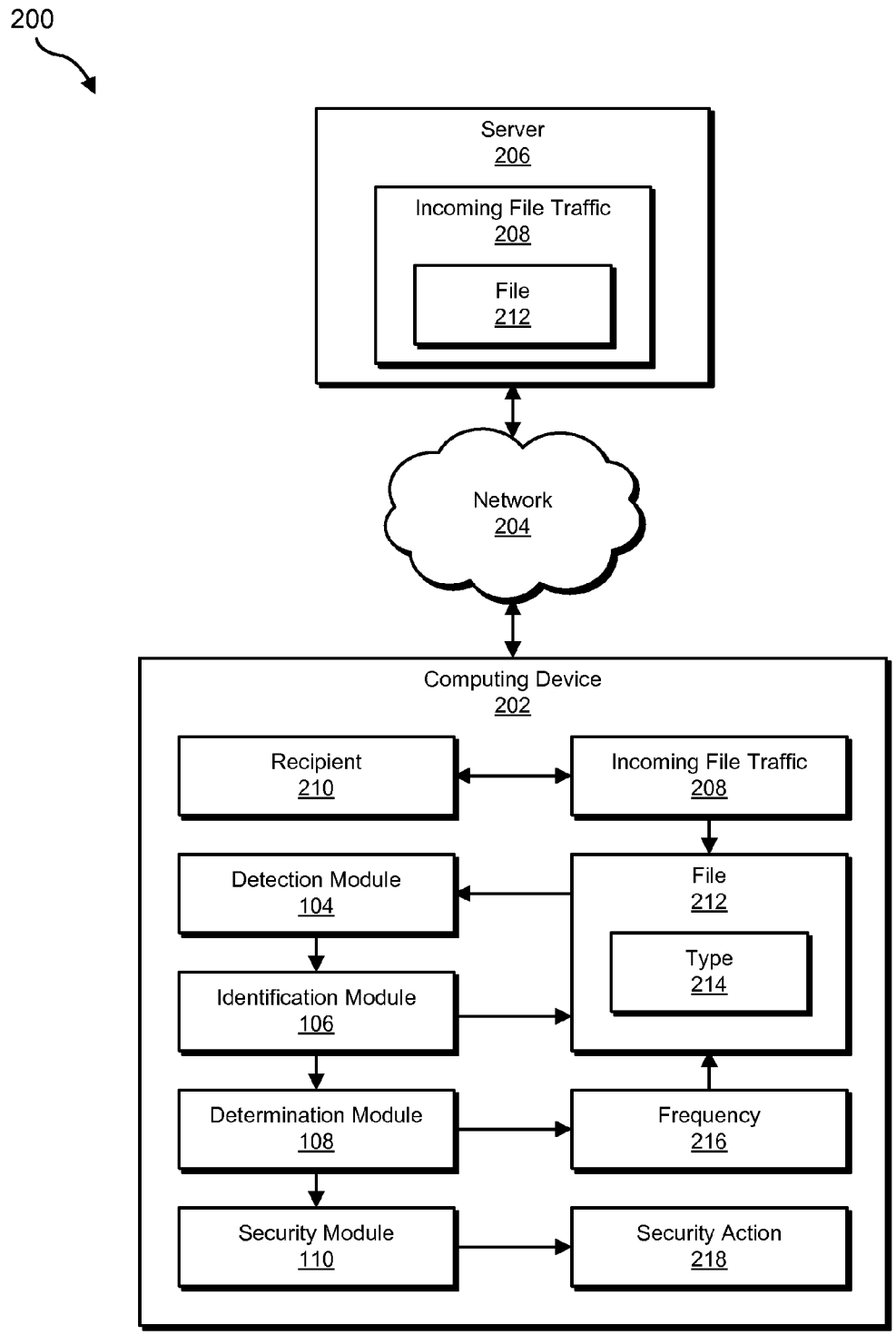
FIG. 2 is a block diagram of an exemplary system for detecting suspicious files.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. Computing device 202 may be programmed with one or more of modules 102. Additionally or alternatively, server 206 may be programmed with one or more of modules 102.

In one embodiment, one or more of modules 102 from FIG. 1 may, when executed by at least one processor of computing device 202 and/or server 206, enable computing device 202 and/or server 206 to detect suspicious files. For example, and as will be described in greater detail below, one or more of modules 102 may cause computing device 202 and/or server 206 to detect suspicious files. For example, detection module 104 may detect a file 212 within incoming file traffic 208 directed to a recipient 210. After file 212 has been detected, Identification module 106 may identify a type 214 of file 212. Next, determination module 108 may determine a frequency 216 with which type 214 of file 212 appears within incoming file traffic 208 directed to recipient 210. Finally, security module 110 may perform a security action 218 on file 212 in response to frequency 216 of type 214 of file 212 within incoming file traffic 208 falling below a predetermined threshold.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Server 206 generally represents any type or form of computing device that is capable of processing file traffic. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
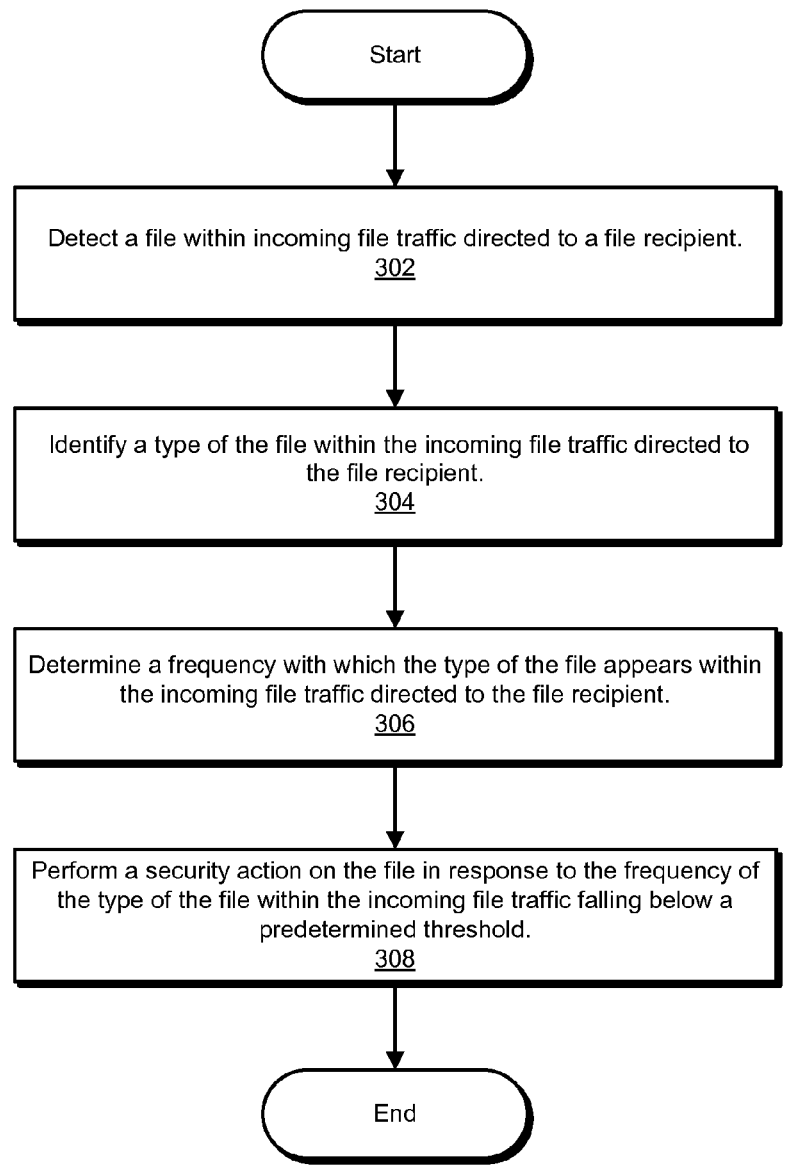
FIG. 3 is a flow diagram of an exemplary method for detecting suspicious files.

FIG. 3 is a flow diagram of an exemplary computer-implemented method 300 for detecting suspicious files. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may detect a file within incoming file traffic directed to a file recipient. For example, at step 302 detection module 104 may, as part of computing device 202 in FIG. 2, detect file 212 within incoming file traffic 208 directed to recipient 210.

Detection module 104 may detect files in a variety of ways and contexts. For example, detection module 104 may detect a file within incoming Internet traffic for an entity. Detection module 104 may also operate from any of a variety of computing devices. For example, detection module 104 may be situated on the file recipient's computing system, on a network router, and/or on a server. In addition, detection module 104 may be located on a router and may detect files in incoming traffic for multiple user accounts belonging to users within an enterprise.

The phrase "incoming file traffic," as used herein, may refer to any data being transferred to the file recipient's computing device, any data addressed to the file recipient, and/or any data addressed to a device in use by the file recipient. In some embodiments, the incoming file traffic may include hypertext transfer protocol traffic, file transfer protocol traffic, and/or email traffic. For example, file traffic may include an audio or video file embedded in a web page and/or a file of any type accessed directly by clicking a link and/or typing the file name in the address bar of an Internet browser. In another example, file traffic may include a file downloaded via FTP. Additionally or alternatively, file traffic may include an email attachment.

The phrase "file recipient," as used herein, generally refers to any entity and/or representation of an entity which is capable of receiving data. The file recipient may include a user account and/or a group of user accounts. In addition, a group of user accounts may represent a variety of potential groupings of users. For example, a group of user accounts may represent a corporation. In another example, a group of user accounts may represent a department within a corporation, such as Information Technology or Human Resources. Additionally or alternatively, a group of users may represent a combined profile for a type of user, such as "casual browser" or "developer." A group of users may be manually defined by an administrator (e.g., in accordance with the users' respective roles within an organization) and/or may be automatically created by monitoring user file download patterns and grouping users with similar behavior.

At step 304, one or more of the systems described herein may identify a type of the file within the incoming file traffic directed to the file recipient. For example, at step 304 identification module 106 may, as part of computing device 202 in FIG. 2, identify type 214 of file 212 within incoming file traffic 208 directed to recipient 210.

Identification module 106 may identify the file type in a variety of ways. For example, identification module 106 may identify an executable file type by analyzing the file within the incoming Internet traffic for the entity. Additionally or alternatively, identification module 106 may identify the file type based on the file's extension, one or more headers associated with the file, the internal format of the file, by looking up the file in a database, and/or by analyzing the structure of the file.

The term "type" and/or phrase "file type," as used herein, generally refers to the method by which information is encoded in a digital storage medium. Examples of file types include, but are not limited to, EXE, JAR, JPG, PNG, GIF, DOC, PDF, TXT, RTF, DOCX, AVI and/or MP3. The term "file type" may also refer to a category of file types, such as the file type "images" that may include JPG, PNG, and/or GIF files and/or the file type "executable files" that may include EXE and/or JAR files.

At step 306, one or more of the systems described herein may determine a frequency with which the type of the file appears within the incoming file traffic directed to the file recipient. For example, at step 306 determination module 108 may, as part of computing device 202 in FIG. 2, determine frequency 216 with which type 214 of file 212 appears within incoming file traffic 208 directed to recipient 210.

Determination module 108 may determine the frequency in a variety of ways and contexts. For example, determination module 108 may determine the frequency with which the executable file type appears by analyzing the incoming Internet traffic for the entity. In one example, determination module 108 may determine the frequency with which the EXE file type appears by calculating the percentage of EXE files among all of the files in the incoming traffic directed to the user. In another example, the file recipient may be a group of users and determination module 108 may determine the frequency by calculating the percentage of files of the type among all files in the incoming traffic directed at the group of users.

Figure 4:
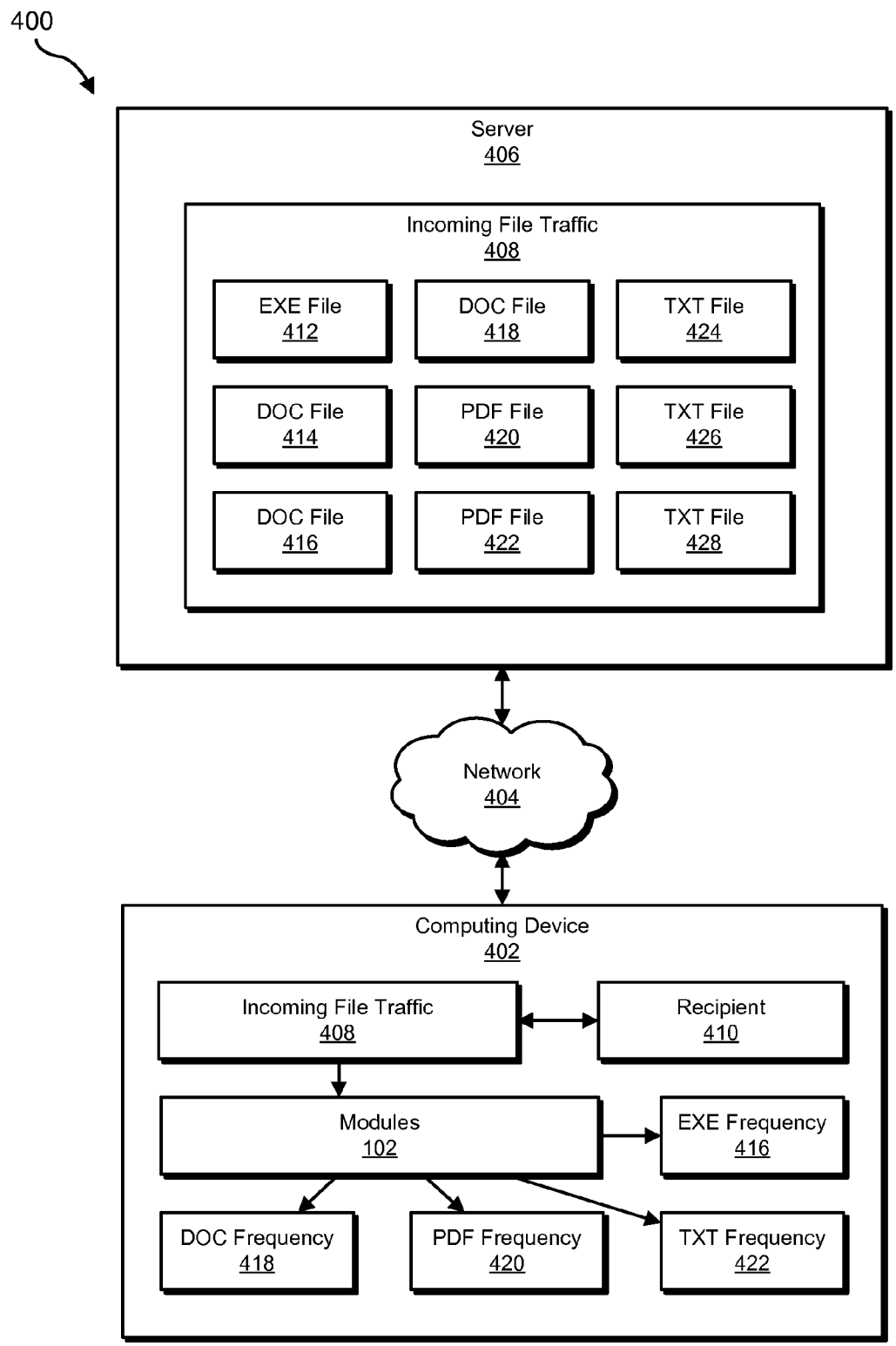
FIG. 4 is a block diagram of an exemplary system for detecting suspicious files.

The term "frequency," as used herein, generally refers to how often a file type appears among incoming file traffic for a file recipient. In various examples, the term "frequency" may refer to the total number of times the file type has appeared, the number of times the file type has appeared relative to all other file types within the incoming file traffic, the total number of times the file type has appeared over a certain duration, the relative number of times the file type has appeared over a certain duration, and/or whether or not the file has appeared at all. FIG. 4 is a block diagram of an exemplary computing system 400 for detecting suspicious files by analyzing relative frequencies of files types in incoming file traffic. As illustrated in FIG. 4, server 406 may process incoming file traffic 408, which may be directed at recipient 410 and/or include EXE file 412, DOC files 414, 416 and/or 418, PDF files 420 and/or 422, and/or TXT files 424, 426 and/or 428. In this example, server 406 may be connected to computing device 402 via network 404. As shown, computing device 404 may receive incoming file traffic 408 for recipient 410 and/or may include modules 102. Modules 102 may then analyze incoming file traffic 408 and may determine EXE frequency 416, DOC frequency 418, PDF frequency 420 and/or TXT frequency 422. In this example, EXE frequency 416 may be 11%, DOC frequency 418 may be 33%, PDF frequency 420 may be 22%, and/or TXT frequency 422 may be 33%.

In some embodiments, determination module 108 may update frequencies for file types whenever the file recipient encounters a new file. For example, a file recipient may have encountered a total of nine files, of which five were documents and four were audio files. If the file recipient encounters another audio file, the frequency for audio file types may be updated from 44% to 50%. In some embodiments, the systems described herein may not calculate file type frequencies until a minimum number of files have been directed to the recipient. For example, determination module 108 may not determine file frequencies for a recipient until at least 50 files have been directed to the recipient. In some embodiments, files determined to be malicious may not be included for the purposes of calculating file type frequencies. Additionally or alternatively, determination module 108 may include only known good files in file type frequency calculations. In some examples, determining the file type frequency may include determining whether the file type has ever been previously detected.

In some embodiments, multiple files of the same type arriving from the same source and/or within a predetermined time period may be counted as a single file for the purposes of calculating file type frequency. For example, a file recipient may receive five executable files from the same source and/or within a short time period (e.g., an hour). In this example, determination module 108 may not count the first four executable files in the group toward the frequency of executable files for purposes of evaluating the fifth executable file within the group. In this manner, an attack that results in downloading multiple malicious files may still result in the fifth executable file being subject to a security action where the systems described herein may otherwise have determined that the executable file type was common enough to not require a security action.

Returning to FIG. 3, at step 308 one or more of the systems described herein may perform a security action on the file in response to the frequency of the type of the file within the incoming file traffic falling below a predetermined threshold. For example, at step 308 security module 110 may, as part of computing device 202 in FIG. 2, perform security action 218 on file 212 in response to frequency 216 of type 214 of file 212 within incoming file traffic 208 falling below a predetermined threshold.

Security module 110 may perform a variety of types of security actions in a variety of contexts. For example, security module 110 may perform a security action on an executable file based on the low frequency of executable files within incoming Internet traffic for the entity. In one example, security module 110 may place a security warning into the email to which the EXE file is attached in response to the frequency of EXE files in incoming traffic for the user being below 5%.

In some embodiments, the security action may include blocking a download of the file and/or warning a user about the file. For example, security module 110 may block the FTP download of the file. In another example, security module 110 may delete an email that includes the file as an attachment. Additionally or alternatively, security module 110 may warn the user that the file is potentially malicious and/or give the user the option to terminate the download of the file. Security module 110 may warn the file recipient and/or any other suitable user, such as a system administrator for the file recipient's computing system.

In some embodiments, the security action may include calculating a security risk score for the file and/or performing a security check on the file. For example, an anti-virus system may analyze the file and assign it a risk score of 100. Security module 110 may add an additional 150 points to the risk score in response to the frequency of the file type falling below the predetermined threshold. In this example, the file may then be classified as malicious because the file's risk score of 250 may exceed a risk score threshold for malicious files of 200. Additionally or alternatively, security module 110 may classify the file as suspicious in response to the frequency of the file type and may trigger an anti-malware check on the file that may not otherwise have been performed.

Figure 5:
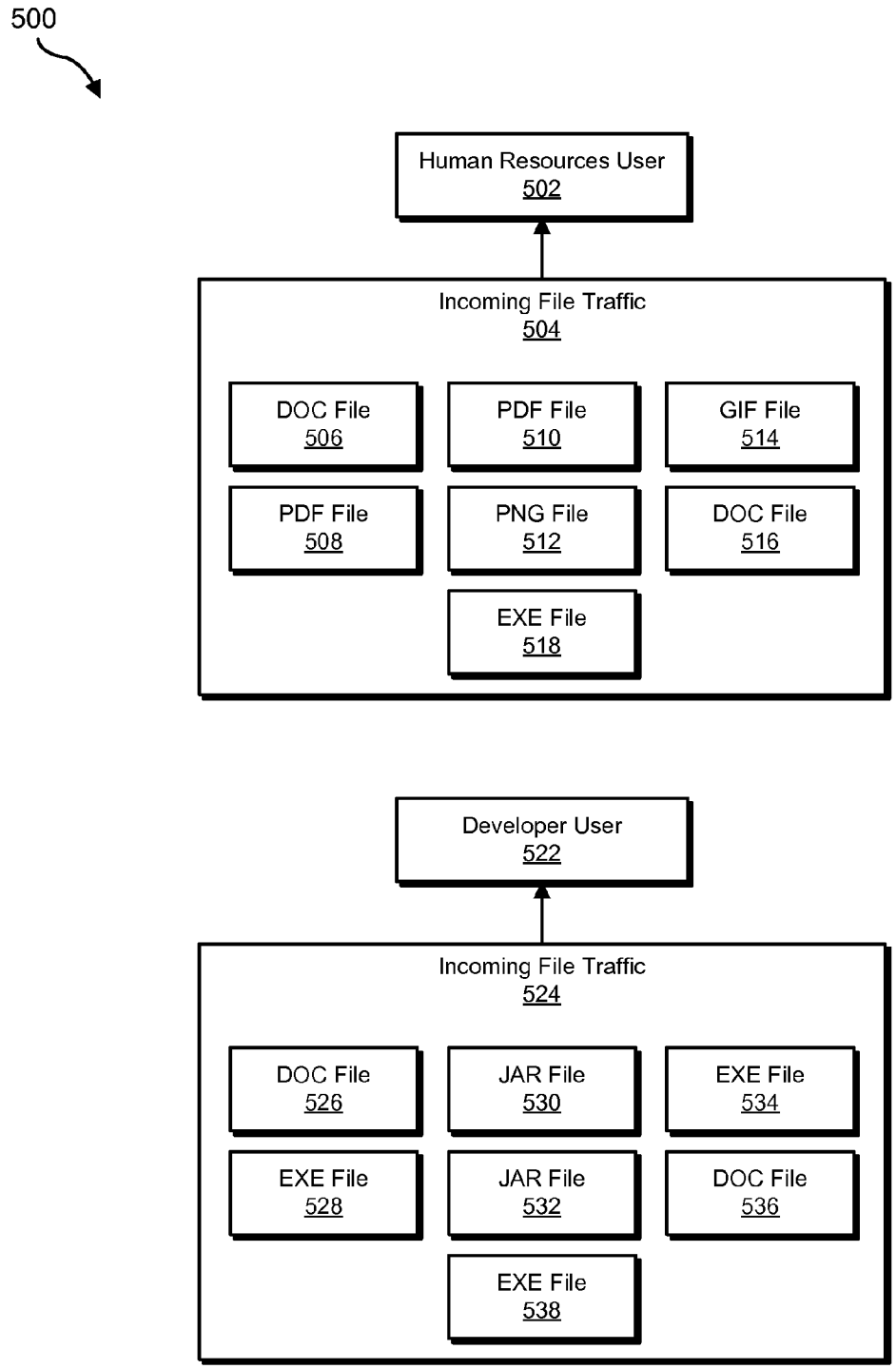
FIG. 5 is a block diagram of an exemplary system for detecting suspicious files.

In some examples, the systems described herein may determine the predetermined threshold by (1) tracking a number of files of each type in a plurality of file types within the incoming traffic directed to the file recipient, (2) calculating a relative frequency for each type of file in the plurality of types of files within the incoming traffic, and (3) setting the predetermined threshold based on the relative frequency of the plurality of types of files. FIG. 5 is a block diagram of an exemplary computing system 500 for detecting suspicious files based on the frequency of file types directed at users of different categories.

As illustrated in FIG. 5, Human Resources (HR) user 502 may access incoming file traffic 504 that may include DOC files 506 and/or 516, PDF files 508 and/or 510, PNG file 512, GIF file 514, and/or EXE file 518. Determination module 108 may analyze incoming file traffic 504 and may determine that HR user 502 encounters files of type document, including PDF and/or DOC files, with a frequency of 57%, files of type image, including PNG and/or GIF files, with a frequency of 29%, and/or files of type executable, including EXE files, with a frequency of 14%. In this example, security module 110 may set the predetermined threshold for file frequency at 20% and/or may perform a security action on EXE file 518 in response to the frequency of executable files for HR user 502, 14%, falling below the predetermined threshold.

In one embodiment, the systems described herein may (1) detect a file of the type within additional incoming traffic directed to an additional file recipient, (2) determine an additional frequency with which the type of the additional file appears within the additional incoming traffic directed to the additional file recipient, and (3) allow a download of the file by the additional file recipient based on the additional frequency of the type of the additional file falling above the predetermined threshold.

For example, as illustrated in FIG. 5, incoming file traffic 524 may be directed to developer user 522 and/or may include EXE files 528, 534, and/or 538, JAR files 530 and/or 532, and/or DOC files 526 and/or 536. Determination module 108 may analyze incoming file traffic 524 and may determine that developer user 522 encounters files of type executable, including EXE and/or JAR files, with a frequency of 71% and/or files of type document, including DOC files, with a frequency of 29%. In this example, security module 110 may allow developer user 522 to download file 538 of type EXE in response to the frequency of 71% for executable files for developer user 522 exceeding the predetermined threshold of 20%.

In some embodiments, the frequencies for file types for the file recipient and/or the predetermined threshold for file frequency may be stored in a centralized data store. The centralized data store may be a server on a local network and/or may be located on a remote server via the Internet. In one example, a user may access a user account via a desktop computer and a mobile device. The file type frequencies for the user account may be stored in a cloud server so that when the user encounters a file on the mobile device, the systems described herein may also use file frequency data gathered from the desktop computer to calculate the overall frequency of the file type for the user account. In another example, incoming file traffic data for the entire development department may be stored on a local server.

In some embodiments, certain types of files may be excluded from analysis. For example, hypertext transfer protocol files may not be counted when calculating the relative percentages of file types within files directed to the file recipient.

As explained above in connection with method 300 in FIG. 3, the systems described herein may detect a file within incoming file traffic and may identify the type of the file. The systems described herein may determine how common the file type is among files received by the file recipient, which may be either a user account or a group of users. File frequency data may be stored in a centralized data store, enabling the systems described herein to use data from multiple computing devices when calculating file frequency for a file recipient.

In some examples, the systems described herein may perform a security action on the file based on the file type being relatively uncommon for the file recipient. The security action may range from warning a user to blocking the file, to adding data to a security score calculated by another security system. Different file types may be handled differently for different file recipients. For example, a developer may be expected to receive a number of executable files, whereas a recruiter may be expected to receive primarily document files and may have a low file frequency for executable files, thus triggering a security action when an executable file is encountered.

By detecting suspicious files based on the relative frequency of file types, the systems described herein may detect potentially malicious files which may be missed by other security systems. In addition, the systems described herein may decrease user frustration by detecting potentially malicious files which may appear as obviously unusual to users, but which may not be detected by traditional systems.

Figure 6:
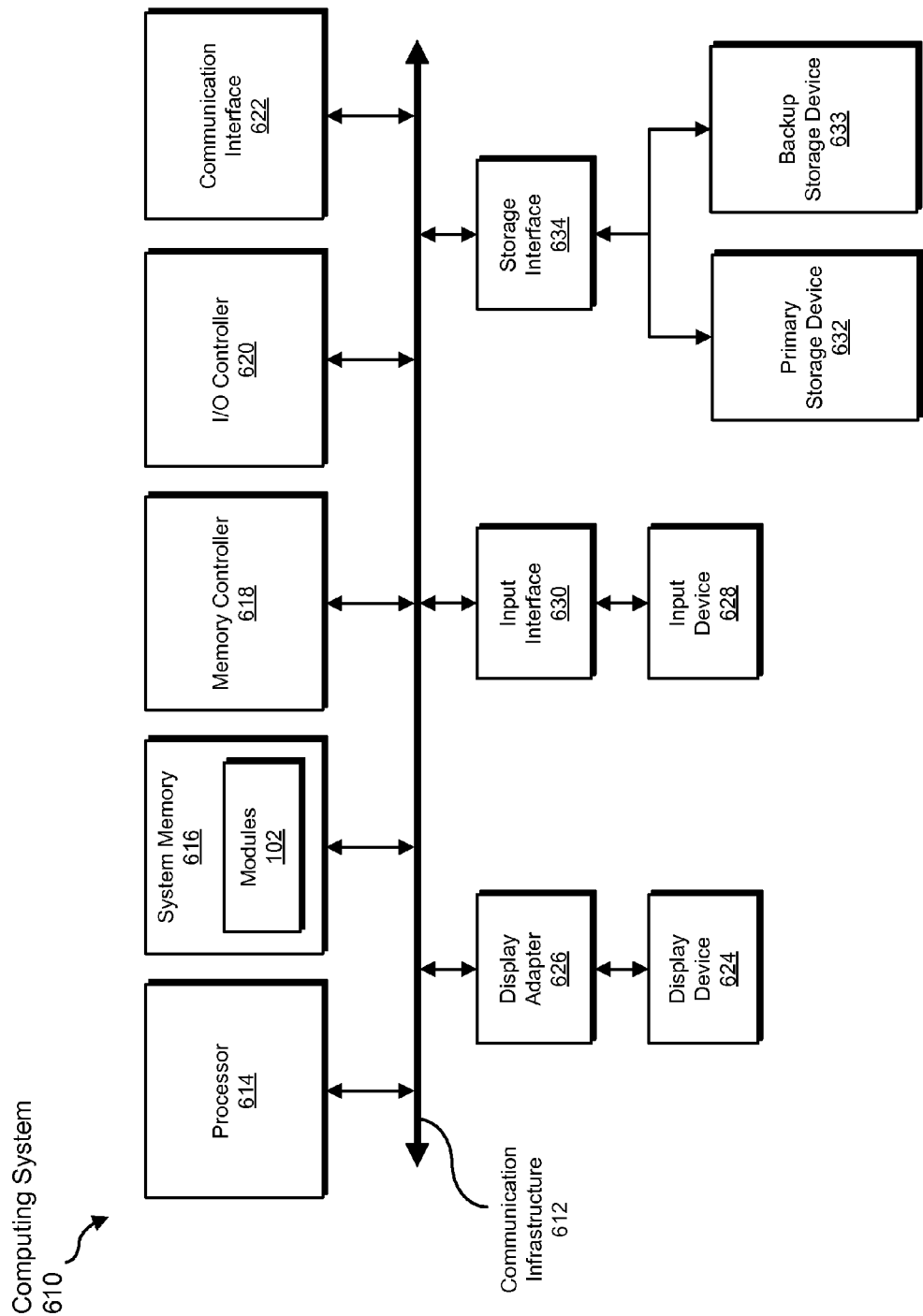
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
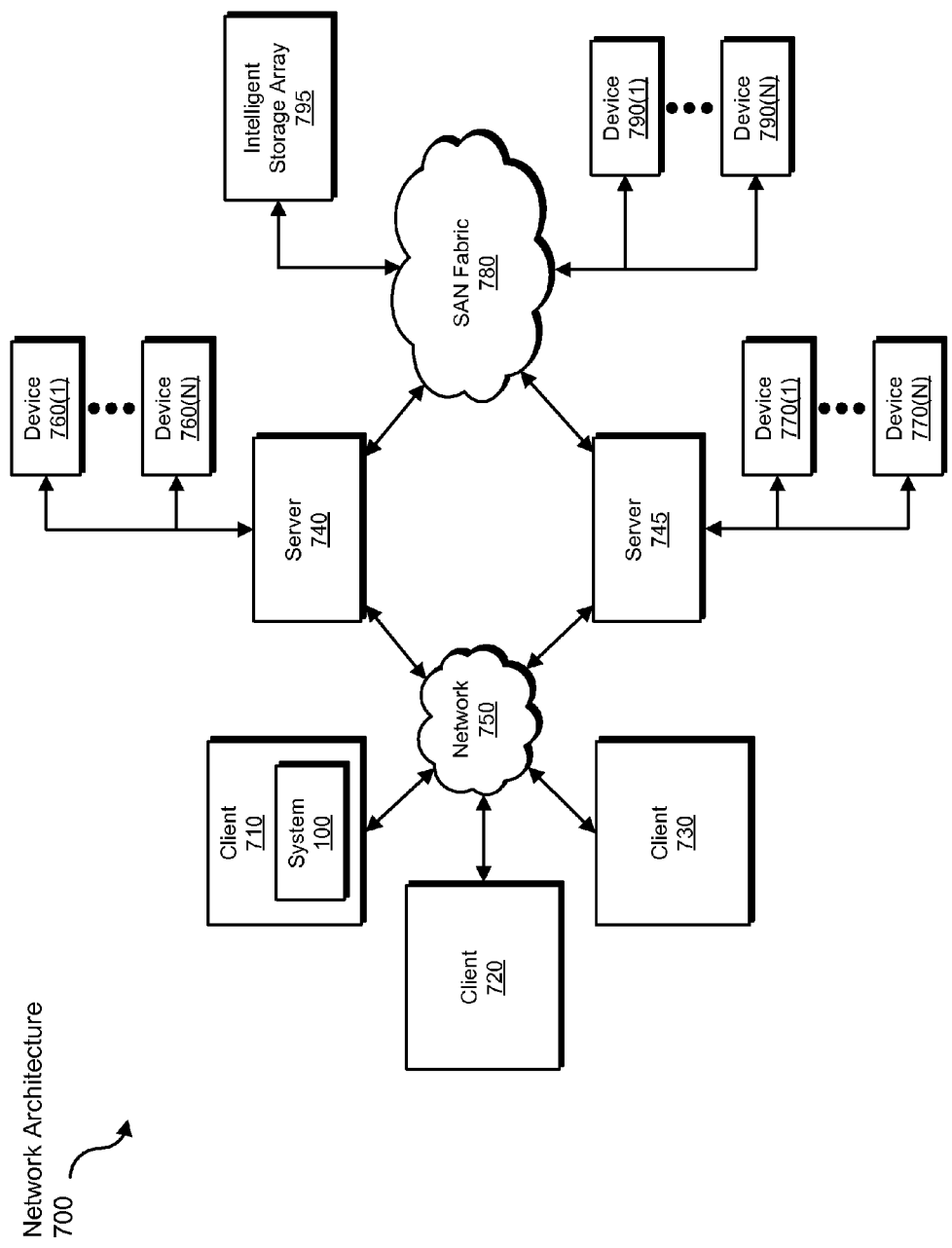
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760 (1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for detecting suspicious files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive incoming file data to be transformed, transform the incoming file data, output a result of the transformation to a security system, use the result of the transformation to determine a file frequency, and store the result of the transformation to a data storage center. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting suspicious files, at least a portion of the method being performed by a computing device comprising at least one hardware processor, the method comprising:
   detecting, by a detection module of the computing device, a file within incoming file traffic directed to a file recipient;
   identifying, by an identification module of the computing device, a type of the file within the incoming file traffic directed to the file recipient;
   determining, by a determination module of the computing device, a frequency with which the type of the file appears within the incoming file traffic directed to the file recipient in comparison to frequencies with which other types of files appear within the incoming file traffic directed to the recipient by:
      tracking a number of files of each type in a plurality of file types within the incoming traffic directed to the file recipient;
      calculating a relative frequency for each type of file in the plurality of types of files within the incoming traffic;
      setting a predetermined threshold based on the relative frequency of the plurality of types of files;
   performing, by a security module of the computing device, a security action on the file in response to the frequency of the type of the file within the incoming file traffic falling below the predetermined threshold.

2. The computer-implemented method of claim 1, wherein the security action comprises at least one of:
   blocking a download of the file;
   warning a user about the file.

3. The computer-implemented method of claim 1, wherein the security action comprises at least one of:
   calculating a security risk score for the file;
   performing a security check on the file.

4. The computer-implemented method of claim 1, wherein multiple files of a same type arriving from a same source and/or within a predetermined time period are counted as a single file for the purposes of calculating file type frequency.

5. The computer-implemented method of claim 1, wherein the incoming file traffic comprises at least one of:
   hypertext transfer protocol traffic;
   file transfer protocol traffic;
   email traffic.

6. The computer-implemented method of claim 1, wherein the computing device comprises at least one of:
   a computing system of the file recipient;
   a network router;
   a server.

7. The computer-implemented method of claim 1, further comprising:
   detecting a new file of the type within further incoming traffic directed to a second file recipient;
   determining an additional frequency with which the type of the new file appears within the further incoming traffic directed to the second file recipient;
   allowing a download of the new file by the second file recipient based on the additional frequency of the type of the new file within the further file traffic directed to the second file recipient exceeding the predetermined threshold.

8. The computer-implemented method of claim 1, wherein:
   detecting the file within the incoming file traffic comprises detecting an executable file;

identifying the type of the file comprises identifying that the type of the file comprises an executable file type;

determining the frequency with which the type of the file appears comprises determining the frequency with which the executable file type appears;

performing the security action on the file comprises performing a security action based at least in part on determining that the file comprises the executable file.

9. A system for detecting suspicious files, the system comprising:

a detection module, stored in memory, that detects a file within incoming file traffic directed to a file recipient;

an identification module, stored in memory, that identifies a type of the file within the incoming file traffic directed to the file recipient;

a determination module, stored in memory, that determines a frequency with which the type of the file appears within the incoming file traffic directed to the file recipient in comparison to frequencies with which other types of files appear within the incoming file traffic directed to the recipient by:

tracking a number of files of each type in a plurality of file types within the incoming traffic directed to the file recipient;

calculating a relative frequency for each type of file in the plurality of types of files within the incoming traffic;

setting a predetermined threshold based on the relative frequency of the plurality of types of files;

a security module, stored in memory, that performs a security action on the file in response to the frequency of the type of the file within the incoming file traffic falling below the predetermined threshold;

at least one physical hardware processor that executes the detection module, the identification module, the determination module, and the security module.

10. The system of claim 9, wherein the security action comprises at least one of:
blocking a download of the file;
warning a user about the file.

11. The system of claim 9, wherein the security action comprises at least one of:
calculating a security risk score for the file;
performing a security check on the file.

12. The system of claim 9, wherein multiple files of a same type arriving from a same source and/or within a redetermined time period are counted as a single file for the purposes of calculating file type frequency.

13. The system of claim 9, wherein the incoming file traffic comprises at least one of:
hypertext transfer protocol traffic;
file transfer protocol traffic;
email traffic.

14. The system of claim 9, wherein the file recipient comprises at least one of:
a user account;
a group of user accounts.

15. The system of claim 9, wherein:
the detection module detects a file of the type within additional incoming traffic directed to an additional file recipient;

the determination module determines an additional frequency with which the type of the additional file appears within the additional incoming traffic directed to the additional file recipient;

the security module allows a download of the file by the additional file recipient in response to the additional frequency of the type of the additional file falling above the predetermined threshold.

16. The system of claim 9, wherein:
the detection module detects the file within incoming file traffic by detecting an executable file;
the identification module identifies the type of the file by identifying that the type of the file comprises an executable file type;
the determination module determines the frequency with which the type of the file appears by determining the frequency with which the executable file type appears;
the security module performs the security action on the file by performing a security action based at least in part on determining that the file comprises the executable file.

17. A non-transitory computer-readable medium comprising one or more computer-readable instructions that, when executed by at least one hardware processor of a computing device, cause the computing device to:

detect a file within incoming file traffic directed to a file recipient;

identify a type of the file within the incoming file traffic directed to the file recipient;

determine a frequency with which the type of the file appears within the incoming file traffic directed to the file recipient in comparison to frequencies with which other types of files appear within the incoming file traffic directed to the recipient by:

tracking a number of files of each type in a plurality of file types within the incoming traffic directed to the file recipient;

calculating a relative frequency for each type of file in the plurality of types of files within the incoming traffic;

setting a predetermined threshold based on the relative frequency of the plurality of types of files;

perform a security action on the file in response to the frequency of the type of the file within the incoming file traffic falling below a predetermined threshold.

18. The non-transitory computer-readable medium of claim 17, wherein the one or more computer-readable instructions cause the computing device to perform the security action by at least one of:
blocking a download of the file;
warning a user about the file.

19. The non-transitory computer-readable medium of claim 17, wherein the one or more computer-readable instructions cause the computing device to perform the security action by at least one of:
calculating a security risk score for the file;
performing a security check on the file.

20. The non-transitory computer-readable medium of claim 17, wherein multiple files of a same type arriving from a same source and/or within a predetermined time period are counted as a single file for the purposes of calculating file type frequency.

* * * * *